(12) United States Patent
Jourdan

(10) Patent No.: US 11,181,435 B2
(45) Date of Patent: Nov. 23, 2021

(54) SNIFFER PROBE, LEAK DETECTOR AND LEAK DETECTION METHOD

(71) Applicant: PFEIFFER VACUUM, Annecy (FR)

(72) Inventor: Pascal Jourdan, Poisy (FR)

(73) Assignee: PFEIFFER VACUUM, Annecy (FR)

( * ) Notice: Subject to any disclaimer, the term of this patent is extended or adjusted under 35 U.S.C. 154(b) by 1 day.

(21) Appl. No.: 16/633,440

(22) PCT Filed: Jun. 15, 2018

(86) PCT No.: PCT/EP2018/065994
§ 371 (c)(1),
(2) Date: Jan. 23, 2020

(87) PCT Pub. No.: WO2019/020274
PCT Pub. Date: Jan. 31, 2019

(65) Prior Publication Data
US 2021/0131902 A1    May 6, 2021

(30) Foreign Application Priority Data
Jul. 26, 2017 (FR) ..................................... 1757110

(51) Int. Cl.
*G01M 3/20*    (2006.01)

(52) U.S. Cl.
CPC ..................... *G01M 3/20* (2013.01)

(58) Field of Classification Search
CPC ............ G01M 3/00; G01M 3/04; G01M 3/24; G01M 3/40

(Continued)

(56) References Cited

U.S. PATENT DOCUMENTS 3,771,349 A * 11/1973 Yatabe ............... G01N 27/4045
73/29.05
4,282,743 A * 8/1981 Pickett .................. G01M 3/223
73/40.7

(Continued)

FOREIGN PATENT DOCUMENTS

DE    199 62 006 A1    6/2001
DE    10 2005 022 157 A1    11/2006

(Continued)

OTHER PUBLICATIONS

Machine Translation of Japanese Patent Application Publication 2002-243576 Which Originally Published on Aug. 28, 2002 (Year: 2002).*

(Continued)

*Primary Examiner* — David A. Rogers
(74) *Attorney, Agent, or Firm* — Oblon, McClelland, Maier & Neustadt, L.L.P.

(57) ABSTRACT

A sniffer probe is provided for a leak detector for checking the leak-tightness of gat object to be tested by means of a tracer gas. The sniffer probe includes a sniffer end piece that is configured to be connected to a pumping device of the leak detector, and a handle bearing the sniffer end piece, a capacitive proximity sensor including at least one handling detection electrode that is arranged in a grip portion of the handle, the capacitive proximity sensor being configured to send a handling detection signal that is associated with the at least one handling detection electrode to a processing unit of the leak detector in order to control the suction into the sniffer end piece according to the handling detection signal. A leak detector and a leak detection method for checking the leak-tightness of an object to be tested by means of a tracer gas are also provided.

13 Claims, 2 Drawing Sheets

(58) Field of Classification Search
USPC ................................................ 73/40–49.8
See application file for complete search history.

(56) References Cited

U.S. PATENT DOCUMENTS

| | | | | |
|---|---|---|---|---|
| 4,294,106 A * | 10/1981 | Gevaud | ................ | G01M 3/202 73/40.7 |
| 4,531,287 A * | 7/1985 | Shibata | ................ | B26B 19/14 200/600 |
| 4,583,394 A * | 4/1986 | Murakami | ............ | G01M 3/202 73/40.7 |
| 4,735,084 A * | 4/1988 | Fruzzetti | ............... | G01M 3/202 73/40.7 |
| 4,785,666 A * | 11/1988 | Bergquist | ............. | G01M 3/202 73/40.7 |
| 5,341,671 A * | 8/1994 | Baret | ................... | G01M 3/202 73/40.7 |
| 5,353,468 A | 10/1994 | Yap et al. | | |
| 5,537,857 A * | 7/1996 | Grosse Bley | ........ | G01M 3/202 73/40 |
| 5,844,204 A * | 12/1998 | Cubizolles | ........ | H03K 17/9645 219/257 |
| 6,314,793 B1 * | 11/2001 | Webb | ...................... | G01M 3/20 422/68.1 |
| 6,362,741 B1 * | 3/2002 | Hickox | ................... | G01M 3/20 340/605 |
| 6,415,650 B1 * | 7/2002 | Bohm | ................... | G01M 3/202 340/605 |
| 7,540,183 B2 * | 6/2009 | Komninos | ............. | G01M 3/24 73/23.2 |
| 7,640,791 B2 * | 1/2010 | Bohm | ................... | G01M 3/205 73/40.7 |
| 7,779,675 B2 * | 8/2010 | Wetzig | ................. | G01M 3/205 73/40.7 |
| 7,980,117 B2 * | 7/2011 | Wetzig | ................. | G01M 3/202 73/40.7 |
| 8,176,770 B2 * | 5/2012 | Wetzig | ................. | G01M 3/205 73/40.7 |
| 8,528,386 B2 * | 9/2013 | Grosse-Bley | ........ | G01M 3/205 73/40.7 |
| 8,689,611 B2 * | 4/2014 | Enquist | ................... | G01M 3/22 73/40.7 |
| 9,308,349 B2 * | 4/2016 | Rezac | ............... | A61M 25/0136 |
| 10,039,605 B2 * | 8/2018 | Kostrzewski | .......... | A61B 34/30 |
| 10,172,697 B2 * | 1/2019 | Bloch | .................. | A61C 17/221 |
| 10,238,413 B2 * | 3/2019 | Hibner | ............... | A61B 18/1445 |
| 10,634,577 B2 * | 4/2020 | Hadj-Rabah | .......... | G06T 19/006 |
| 2003/0205492 A1 | 11/2003 | Ferber et al. | | |
| 2005/0126264 A1 * | 6/2005 | Komninos | ............. | G01M 3/24 73/40.5 A |
| 2005/0196721 A1 | 9/2005 | Jackson, III et al. | | |
| 2006/0174696 A1 * | 8/2006 | Komninos | ............. | G01M 3/24 73/40.5 A |
| 2006/0273806 A1 | 12/2006 | Kirchner et al. | | |
| 2007/0039377 A1 * | 2/2007 | Bohm | .................. | G01M 3/207 73/40.7 |
| 2007/0240493 A1 * | 10/2007 | Conlan | ................ | G01M 3/205 73/40.7 |
| 2008/0000288 A1 * | 1/2008 | Bley | ..................... | G01M 3/205 73/40.7 |
| 2008/0006080 A1 * | 1/2008 | Wetzig | ................. | G01M 3/205 73/40.7 |
| 2008/0276692 A1 * | 11/2008 | Wetzig | ................. | G01M 3/205 73/40.7 |
| 2009/0079444 A1 | 3/2009 | Khapochkin et al. | | |
| 2009/0188302 A1 * | 7/2009 | Rolff | ..................... | G01M 3/207 73/40.7 |
| 2009/0193876 A1 * | 8/2009 | Wetrzig | ................ | G01M 3/205 73/40.7 |
| 2009/0212960 A1 | 8/2009 | Rolff et al. | | |
| 2009/0277250 A1 * | 11/2009 | Wetzig | ................. | G01M 3/205 73/40.7 |
| 2009/0288477 A1 | 11/2009 | Grosse Bley et al. | | |
| 2010/0095745 A1 * | 4/2010 | Flynn | .................... | G01M 3/207 73/40.7 |
| 2010/0288020 A1 * | 11/2010 | Enquist | ................... | G01M 3/22 73/40.7 |
| 2012/0261569 A1 * | 10/2012 | Grosse Bley | ......... | G01M 3/229 250/282 |
| 2013/0125441 A1 * | 5/2013 | Westwood | .............. | F41A 17/02 42/70.05 |
| 2013/0213114 A1 | 8/2013 | Wetzig et al. | | |
| 2013/0283890 A1 * | 10/2013 | Komninos | .............. | G01M 3/04 73/40 |
| 2014/0292396 A1 | 10/2014 | Bruwer et al. | | |
| 2015/0053042 A1 * | 2/2015 | Shirakawa | ............ | B62B 5/0073 74/523 |
| 2015/0068288 A1 * | 3/2015 | Gaudet | .................... | G01M 3/22 73/40.7 |
| 2016/0067726 A1 * | 3/2016 | Gilpatrick | ............. | B05B 12/004 239/526 |
| 2016/0076952 A1 * | 3/2016 | Kim | ...................... | G06F 1/1684 345/173 |
| 2016/0116443 A1 * | 4/2016 | Choi | ...................... | G01H 13/00 73/579 |
| 2016/0223424 A1 | 8/2016 | Hilgers et al. | | |
| 2017/0135513 A1 * | 5/2017 | Geurts | .................... | A47J 27/21 |
| 2018/0328809 A1 * | 11/2018 | Bruhns | ................. | G01M 3/205 |
| 2019/0128765 A1 * | 5/2019 | Hadj-Rabah | .......... | G06T 19/006 |
| 2019/0212221 A1 * | 7/2019 | Decker | ................. | G01M 3/205 |

FOREIGN PATENT DOCUMENTS

| | | |
|---|---|---|
| EP | 0 537 845 A1 | 4/1993 |
| EP | 1 990 629 A1 | 11/2008 |
| JP | 2002243576 A * | 8/2002 |
| WO | 2009/130666 A1 | 10/2009 |

OTHER PUBLICATIONS

International Search Report dated Jul. 2, 2018 in PCT/EP2018/065994 filed Jun. 15, 2018, therein 3 pages.

Office Action dated Jul. 15, 2021 in corresponding Chinese Patent Application No. 201880048097.X, and an English translation, citing references AA-AH and AO.

* cited by examiner

SNIFFER PROBE, LEAK DETECTOR AND LEAK DETECTION METHOD

BACKGROUND

The present invention relates to a sniffer probe, a leak detector and a leak detection method for checking the leak-tightness of an object to be tested by means of a tracer gas.

A known method for checking the leak-tightness of an object consists of carrying out a so-called tracer gas "sniffer" test. In this method a leak detector connected to a sniffer probe is used to search for the possible presence of the tracer gas around an object to be tested filled with a tracer gas which is generally pressurized. This method calls upon the detection of the passage of the tracer gas through the possible leaks of the object to be tested. The searching for leaks is carried out by moving the end of the sniffer probe around the object to be tested, notably in the areas likely to have leak-tightness weaknesses, such as for example around sealing gaskets.

The sniffer probe is formed by a predetermined conductance arranged at the end of a flexible pipe of the leak detector. The conductance makes it possible to limit the flow of the gas sucked in during the search. A filter making it possible to prevent a clogging of the probe is also fitted in the end piece, in series with and upstream of the conductance.

However, a rather rapid clogging of the filter during use is observed, which can necessitate a relatively frequent maintenance intervention on the sniffer probe.

SUMMARY

One of the purposes of the present invention therefore is to propose a sniffer probe and a leak detector making it possible to limit the clogging of the filter of the sniffer probe.

For this purpose, the invention relates to a sniffer probe for a leak detector for checking the leak-tightness of an object to be tested by means of a tracer gas, the sniffer probe comprising:
 a sniffer end piece configured to be connected to a pumping device of the leak detector, and
 a handle bearing the sniffer end piece,
characterized in that the sniffer probe comprises moreover a capacitive proximity sensor comprising at least one handling detection electrode arranged in a grip portion of the handle, the capacitive proximity sensor being configured to send a handling detection signal associated with the at least one handling detection electrode to a processing unit of the leak detector in order to control the suction into the sniffer end piece as a function of the handling detection signal.

When the user grasps the handle of the sniffer probe in order to carry out a leak-tightness check, the capacitive proximity sensor detects the handling of the probe. This detection makes it possible to know that the user wishes to use the leak detector without him having to voluntarily operate a control button. It is therefore possible to stop the suction into the probe when it is not in use without necessitating a particular action by the user. The clogging of the filter when the probe is not in use is thus avoided, which makes it possible to preserve its service life.

According to one or more features of the sniffer probe, taken alone or in combination:
 the at least one handling detection electrode of the capacitive proximity sensor has a generally tubular shape,
 the capacitive proximity sensor comprises two handling electrodes electrically isolated from each other, the general shape of the two handling electrodes arranged opposite each other in the handle being tubular,
 the capacitive proximity sensor comprises an additional detection electrode electrically isolated from the at least one handling detection electrode, the at least one additional detection electrode being arranged in a frontal part of the handle, the capacitive proximity sensor being configured to send a control signal to the processing unit when a contact with or an approach towards the frontal part of the handle is detected,
 the sniffer probe comprises a light emitting diode arranged in a frontal part of the sniffer probe, configured to illuminate a search area situated in front of the sniffer end piece, the switching on and off of the light emitting diode being controlled by the control signal associated with the additional detection electrode,
 the at least one handling detection electrode and/or the additional detection electrode of the capacitive proximity sensor comprises a conductive coating, such as a metallization,
 the handle comprises two half-shells, the conductive coating being deposited on the internal surface of the half-shells.

The invention also relates to a leak detector for checking the leak-tightness of an object to be tested by means of a tracer gas, comprising:
 a sniffer probe such as described above,
 a base unit comprising a pumping device, a gas detector fluidly connected to the pumping device and a processing unit, and
 a flexible pipe fluidly connecting the pumping device of the base unit to the sniffer probe.

The leak detector can comprise an isolation valve arranged between the pumping device and the sniffer probe, the processing unit being configured to control the opening of the isolation valve when a handling detection signal associated with the at least one handling detection electrode is greater than or equal to a threshold, and to control the closing of the isolation valve when the handling detection signal is less than the threshold.

The invention also relates to a leak detection method using a sniffer probe such as described above, in which:
 the suction into the sniffer end piece is controlled when a handling detection signal associated with the at least one handling detection electrode is greater than or equal to a threshold, and
 the stopping of the suction into the sniffer end piece is controlled when the handling detection signal is less than the threshold.

For example, in the leak detection method, provision is made to:
 control the suction into the sniffer end piece when a first handling detection signal associated with a first handling detection electrode and a second handling detection signal associated with a second handling detection electrode are simultaneously greater than or equal to a threshold, and
 control the stopping of the suction into the sniffer end piece when the first and/or the second handling detection signal is less than the threshold.

Provision can also be made to reduce the speed of rotation of a rough-vacuum pump of the pumping device when the stopping of the suction into the sniffer end piece is controlled.

BRIEF DESCRIPTION OF THE DRAWINGS

Other features and advantages of the invention will become apparent in the following description, given by way of example, not limiting in nature, and with reference to the appended drawings in which.

In these figures, the identical elements bear the same reference numbers. The following embodiments are examples. Even though the description refers to one or more embodiments, this does not necessarily signify that each reference relates to the same embodiment, or that the features only apply to a single embodiment. Simple features of different embodiments can also be combined in order to provide other embodiments.

In the rest of the description, the terms "upstream" and "downstream" will be used with reference to the direction of gas flow.

DETAILED DESCRIPTION

Figure 1:
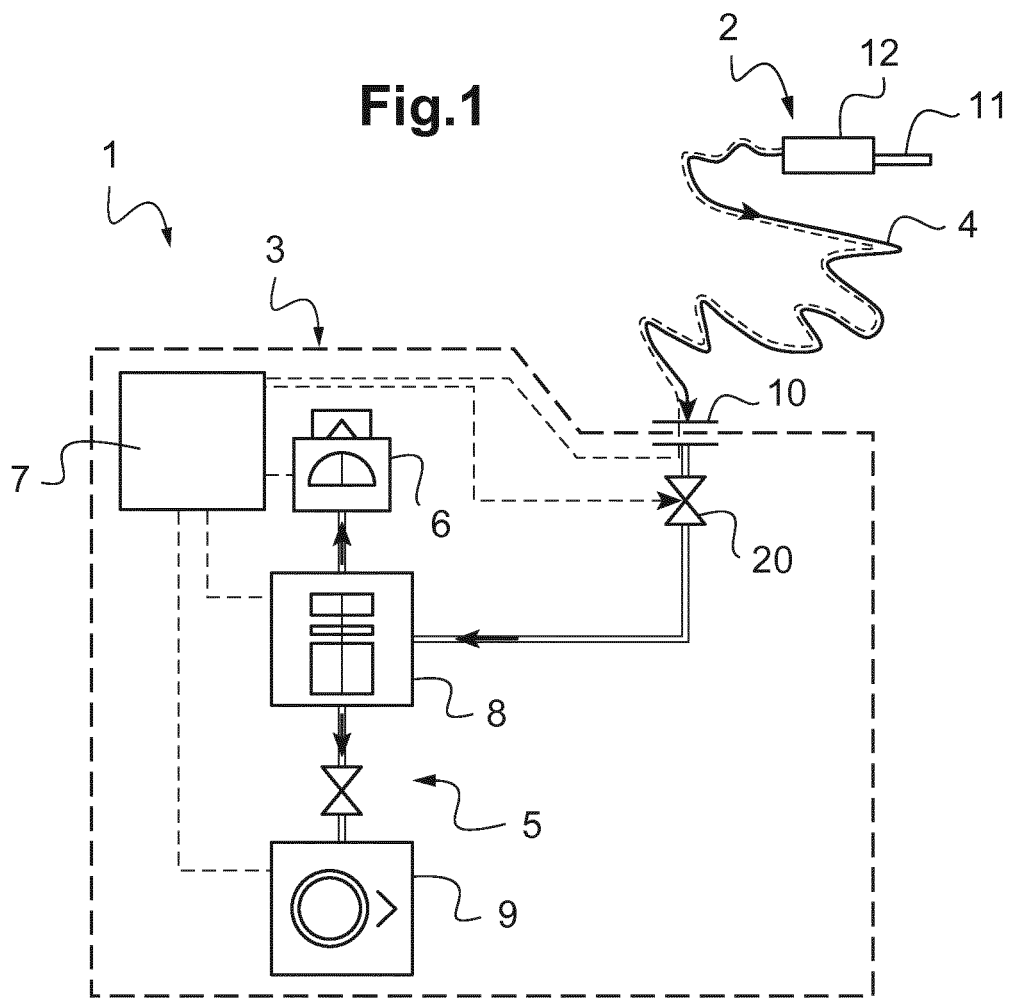
FIG. 1 shows a diagrammatic view of a leak detector.

FIG. 1 shows a diagrammatic view of an example of a leak detector 1 for checking the leak-tightness of an object to be tested by means of a tracer gas.

The leak detector 1 comprises a sniffer probe 2, a base unit 3 and a flexible pipe 4 fluidly connecting a pumping device 5 of the base unit 3 to the sniffer probe 2 for sucking into the sniffer probe 2 whilst searching for leaks.

The base unit 3 comprises a gas detector 6 fluidly connected to the pumping device 5 as well as a processing unit 7.

The pumping device 5 comprises for example a secondary vacuum pump 8, such as a turbomolecular pump, and a rough-vacuum pump 9, connected in series. The rough-vacuum pump 9 is for example a diaphragm pump, which sucks in gasses and delivers them at atmospheric pressure.

The gas detector 6 is connected to the intake of the secondary vacuum pump 8 whose outlet is connected to the intake of the rough-vacuum pump 9. The input 10 of the base unit 3 of the leak detector 1 is connected to an intermediate stage of the secondary vacuum pump 8.

The gas detector 6 comprises for example a mass spectrometer.

The processing unit 7 is connected to the pumping device 5 and to the gas detector 6. The processing unit 7 comprises one or more controllers or microcontrollers or computers comprising memories and programs suitably adapted for controlling the functioning of the vacuum pumps 8, 9 and of the gas detector 6.

The leak detector 1 make it possible to search for the possible presence of a tracer gas around an object to be tested filled with the tracer gas, generally pressurized. This method calls upon the detection of the passage of the tracer gas through the possible leaks in the object to be tested. The search for leaks is carried out by moving the end of a sniffer end piece 11 of the probe 2 around the object to be tested, notably in areas likely to have leak-tightness weaknesses, such as for example around sealing gaskets. Helium or hydrogen is generally used as a tracer gas because these gasses pass through small leaks more easily than other gasses, because of the small size of their molecules and of their high speeds of displacement.

Figure 2:
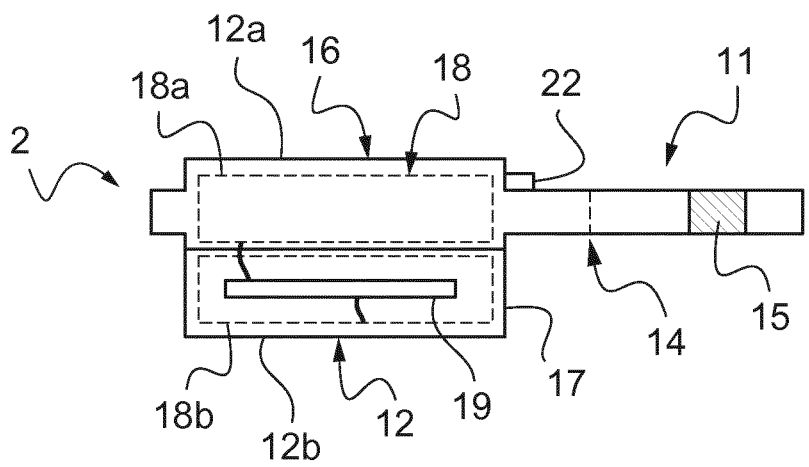
FIG. 2 shows a diagrammatic view of a sniffer probe of the leak detector shown in FIG. 1.

As can be better seen in FIG. 2, the sniffer probe 2 comprises a handle 12 bearing the sniffer end piece 11 to which it is fixed and a capacitive proximity sensor 13.

The sniffer end piece 11 is configured to be fluidly connected to the pumping device 5. The sniffer end piece 11 comprises for example a rigid tube of small diameter which is connected to the end of the flexible pipe 4, which is itself connected to the pumping device 5. The sniffer end piece 11 comprises a predefined conductance 14 configured for limiting the flow of gas sucked in by the pumping device 5. The predefined conductance 14 is for example formed by a capillary, a nozzle such as a drilled ruby, or a porous membrane or a needle arranged in the tube.

At least one filter 15 is arranged in the tube of the sniffer end piece 11, in series with the predefined conductance 14, for example upstream of the latter. The filter 15 filters the dust that can come from the external atmosphere, which makes it possible to prevent the clogging of the probe 2. Several filters can be provided in series, upstream of the predefined conductance 14, such as a first filter made of sintered metal for the dust particles included in the range 10 μm to 20 μm and a second filter based on felt fibers pour the finer dust particles for example included in the range 5 μm to 10 μm.

The handle 12 comprises a grip portion 16, designed to be grasped, held and manipulated by the user's hand. The grip portion 16 forms the sleeve of the handle 12. It can have ergonomic shapes facilitating the grasping.

The handle 12 comprises for example two half-shells 12a, 12b (FIG. 2) which are for example made of plastic and are traversed by the sniffer end piece 11 at the frontal part 17 of the handle 12.

The capacitive proximity sensor 13 comprises at least one handling detection electrode 18 arranged in the grip portion 16 of the handle 12 for detecting approach towards or contact with the grip portion 16.

The handling detection electrode 18 is made of electrically conductive material, such as aluminum or copper, making it possible to detect approach from a few centimeters away or contact by a finger or by a hand.

The handling detection electrode 18 has for example a generally tubular shape, for example similar to the shape of the sleeve of the grip portion 16. The generally tubular shape is arranged in the grip portion 16 of the handle 12 in such a way as to detect any contact with or approach towards the grip portion 16 of the handle 12. The handling detection electrode 18 can be made in one or more parts 18a, 18b electrically connected with each other.

The handling detection electrode 18 comprises for example a conductive coating, such as a metallization. The electrode 18 is thus simple to produce and follows as closely as possible the shape of the grip portion 16 of the handle 12 whatever that shape may be, in order to detect a contact with or an approach towards the whole of the grip portion 16.

The conductive coating is for example deposited on the internal surface of the two half-shells 12a, 12b. It is thus protected by the handle 12.

Figure 3:
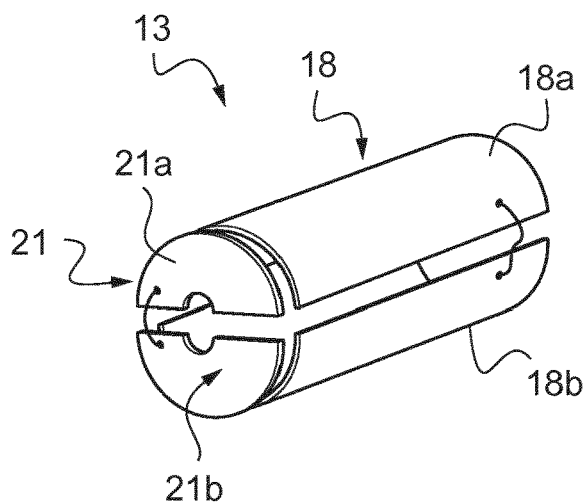
FIG. 3 shows a diagrammatic view of a handling detection electrode and of an additional detection electrode of a capacitive proximity sensor of the sniffer probe shown in FIG. 2 according to a first example of embodiment.

FIG. 3 shows an example embodiment of a handling detection electrode 18 produced by two conductive coatings in the form of cylindrical half-tubes electrically connected with each other, for example deposited on the internal surfaces of the grip portion 16 of the two half-shells 12a, 12b of the handle 12.

The capacitive proximity sensor 13 is configured to send a handling detection signal associated with the handling detection electrode 18 to the processing unit 7 in order to control the suction into the sniffer end piece 11 as a function of the handling detection signal.

For this purpose, the capacitive proximity sensor 13 comprises an electronic board 19 connected to the at least one handling detection electrode 18 (FIG. 2). The electronic board 19 is for example positioned in the handle 12. The electronic board 19 is connected to the processing unit 7, for example by electrical wires carried by the flexible pipe 4.

For this purpose, the processing unit 7 controls an isolation valve 20 of the leak detector 1, arranged between the pumping device 5 and the sniffer probe 2. The isolation valve 20, such as an electrovalve, is for example arranged in the base unit 3, between the inlet 10 and the secondary vacuum pump 8.

For this purpose, the processing unit 7 controls an isolation valve 20 of the leak detector 1, arranged between the pumping device 5 and the sniffer probe 2. The isolation valve 20, such as an electrovalve, is for example arranged in the base unit 3, between the inlet 10 and the secondary vacuum pump 8.

The isolation valve 20 is controlled to be open when the handling detection signal is greater than or equal to the threshold and is controlled to be closed when the handling detection signal is less than the threshold.

When the user grasps the handle 12 of the sniffer probe 2 in order to carry out a leak test, the capacitive proximity sensor 13 detects the handling of the probe 2. This detection makes it possible to know that the user wishes to use the leak detector 1 without him having to voluntarily operate a control button. It is therefore possible to stop the suction into the probe 2 when it is not in use without necessitating a particular action by the user. The clogging of the filter 15 when the probe 2 is not in use is thus avoided, which makes it possible to preserve its service life.

According to one example embodiment which can be seen in FIG. 3, the capacitive proximity sensor 13 comprises an additional detection electrode 21 electrically isolated from the at least one handling detection electrode 18.

The additional detection electrode 21 is arranged in the frontal part 17 of the handle 12 where the sniffer end piece 11 emerges. The frontal part 17 of the handle 12 is not naturally touched by the user when he grasps the handle, contrary to the grip portion 16 of the handle 12.

Like the handling detection electrode 18, the additional detection electrode 21 is made from a material which is conductive to electricity such as aluminum or copper, and can be formed by a conductive coating, for example deposited on the internal surface of the two half-shells 12a, 12b.

The additional detection electrode 21 covers for example all of the frontal part 17 of the handle 12 in order to detect the user's approach or contact at any place on the frontal part 17. The additional detection electrode 21 has for example an annular shape. The additional detection electrode 21 can be produced in one or more parts 21a, 21b electrically connected to each other. FIG. 3 thus shows an additional detection electrode 21 produced by two conductive coatings in the form of half-washers, deposited on the internal surfaces of the frontal part 17 of the two half-shells 12a, 12b of the handle 12 and electrically connected with each other. The electrical isolation between the handling detection electrode 18 arranged in the handle 12 and the additional detection electrode 21 arranged in the frontal part 17 is produced here by the fact that the conductive coatings do not touch each other and are separated by the plastic material of the half-shells 12a, 12b.

The additional detection electrode 21 is connected to the electronic board 19. The capacitive proximity sensor 13 is moreover configured to send a control signal to the processing unit 7 when a contact with or approach towards the frontal part 17 of the handle 12 is detected, that is to say when the pressing detection signal associated with the additional detection electrode 21 is greater than or equal to a threshold.

The control signal can be used for controlling a component of the leak detector 1. Advantage is thus taken of the means used for the detection of the handling of the probe 2 in order to add a "switch" function in a detection area outside of the grip portion 16.

Figure 4:
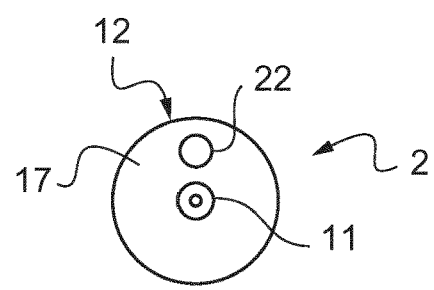
FIG. 4 shows a front view of the sniffer probe shown in FIG. 2.

According to one example embodiment, the sniffer probe 2 comprises a light emitting diode 22 arranged in the frontal part 17 of the probe 2, configured to illuminate a search area situated in front of the sniffer end piece 11 (FIGS. 2 and 4). The switching on and off of the light emitting diode 22 can be controlled by the control signal associated with the additional detection electrode 21, representative of the detection of a contact with or an approach towards the frontal part 17.

During operation, the object to be tested is filled with a tracer gas, generally pressurized.

When the user grasps the handle 12 of the sniffer probe 2 in order to carry out a leak-tightness test, the capacitive proximity sensor 13 detects the handling of the probe 2. When the handling detection signal associated with the handling detection electrode 18 is greater than or equal to a threshold, the isolation valve 20 of the leak detector 1 is controlled to be open in order to suck into the sniffer end piece 11. The user then searches for the presence of the tracer gas by moving the sniffer end piece 11 around the object to be tested. A portion of the gasses sampled by the sniffer probe 2, possibly containing the tracer gas revealing a leak, is analyzed by the gas detector 6 which provides a measurement of the concentration of tracer gas signal.

The suction into the sniffer end piece 11 is maintained as long as the handle 2 is held by the user.

The user can facilitate his search by controlling the switching on of the light emitting diode 22 in order to illuminate the search area by touching the frontal part 17 of the sniffer probe 2. He can then switch off the light emitting diode 22 by pressing on the frontal part 17 again.

Then, at the end of use, the user puts down the sniffer probe 2, no contact or approach is then detected by the handling detection electrode 18 of the capacitive proximity sensor 13. When the handling detection signal is less than the threshold, the stopping of the suction into the sniffer end piece 11 is controlled by closing an isolation valve 20 in order to stop the pumping into the sniffer end piece 11.

It is also possible to reduce the speed of rotation of the rough-vacuum pump 9 of the pumping device 5 when the stopping of suction into the sniffer end piece 11 is controlled in order to reduce the energy consumption of the device 1 when it is not in use.

Figure 5:
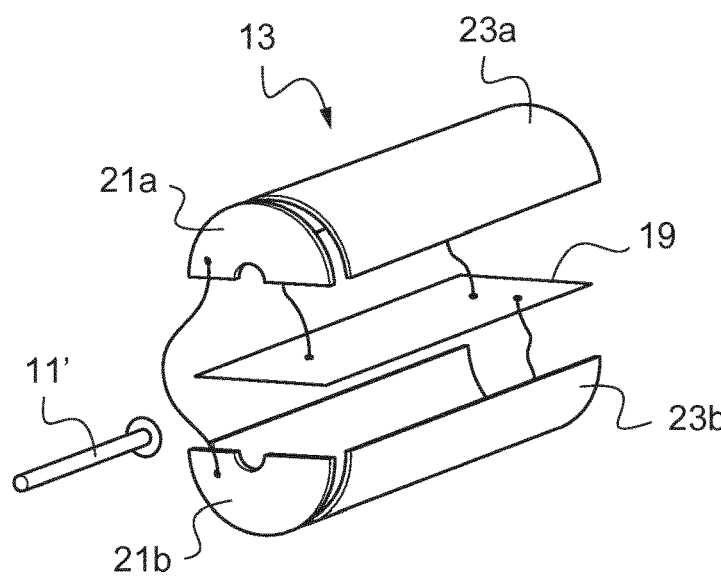
FIG. 5 shows a diagrammatic view of two handling detection electrodes and of an additional detection electrode of a proximity sensor of a sniffer probe according to a second example of embodiment.

FIG. 5 shows a second example of embodiment.

In this example, the capacitive proximity sensor 13 comprises who handling electrodes 23a, 23b electrically isolated from each other.

The general shape of the two handling electrodes 23a, 23b arranged opposite each other in the handle 12 is for example tubular, for example similar to the shape of the sleeve of the grip portion 16, in order to detect a contact with or an approach towards the whole of the grip portion 16 of the handle 12.

As in the first example of embodiment, the handling detection electrode 23a, 23b comprises for example a conductive coating, for example deposited on the internal surface of the two half-shells 12a, 12b. FIG. 5 thus shows two handling electrodes 23a, 23b produced by two conductive coatings in the form of cylindrical half-tubes, deposited in the internal surfaces of the grip portion 16 of the two half-shells 12a, 12b and electrically isolated from each other. The electrical isolation between the two handling electrodes 23a, 23b is produced here by the fact that the conductive coatings do not touch each other and are separated by the plastic material of the half-shells 12a, 12b.

Figure 6:
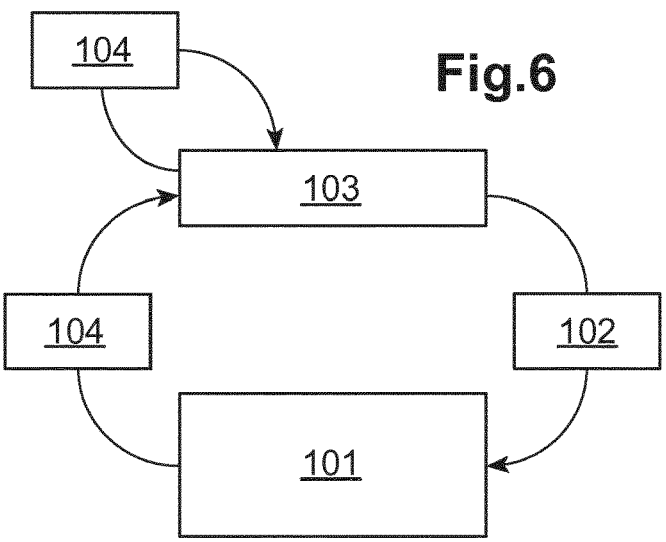
FIG. 6 shows a flow chart of an example of a leak detection method using the proximity sensor shown in FIG. 5.

In operation (FIG. 6), the suction into the sniffer end piece 11 (step 101) is controlled when a first handling detection signal associated with a first handling detection electrode 23a and a second handling detection signal associated with a second handling detection electrode 23b are simultaneously greater than or equal to a threshold (step 102). The stopping of the suction into the sniffer end piece 11 (step 103) is controlled when the first and/or the second handling detection signal is less than the threshold (step 104).

A simultaneous detection of a contact with or of an approach towards the grip portion 16 by the two electrodes 23a, 23b makes it possible to differentiate a handling of the grip portion 16 by the user from a simple contact of the probe 2 with a metal surface for example. The simultaneous detection by both sides of the grip portion 16 of the probe 2 makes it possible to ensure that the probe 2 is actually grasped by the user in order to be used and that it is not simply placed on a metal support.

It is also possible to reduce the speed of rotation of the rough-vacuum pump 9 when the stopping of the suction into the sniffer end piece 11 is controlled.

The capacitive proximity sensor 13 also comprises, in this example, an additional detection electrode 21 electrically isolated from the handling electrodes 23a, 23b, which is arranged in the frontal part 17 and which is connected to the electronic board 19.

The invention claimed is:

1. A sniffer probe for a leak detector for checking the leak-tightness of an object to be tested by means of a tracer gas, the sniffer probe comprising:
    a sniffer end piece configured to be connected to a pumping device of the leak detector,
    a handle bearing the sniffer end piece, and
    a capacitive proximity sensor comprising at least one handling detection electrode arranged in a grip portion of the handle, the capacitive proximity sensor being configured to send a handling detection signal associated with the at least one handling detection electrode to a processing unit of the leak detector in order to control suction into the sniffer end piece as a function of the handling detection signal,
    wherein the capacitive proximity sensor comprises at least one additional detection electrode electrically isolated from the at least one handling detection electrode, the at least one additional detection electrode being arranged in a frontal part of the handle, the capacitive proximity sensor being configured to send a control signal to the processing unit when a contact with or an approach towards the frontal part of the handle is detected.

2. The sniffer probe as claimed in claim 1, wherein the at least one handling detection electrode of the capacitive proximity sensor has a generally tubular shape.

3. The sniffer probe as claimed in claim 1, wherein the capacitive proximity sensor comprises two handling electrodes electrically isolated from each other, a general shape of the two handling electrodes arranged opposite each other in the handle being tubular.

4. The sniffer probe as claimed claim 1, further comprising a light emitting diode arranged in a frontal part of the sniffer probe, configured to illuminate a search area situated in front of the sniffer end piece, a switching on and off of the light emitting diode being controlled by the control signal associated with the additional detection electrode.

5. The sniffer probe as claimed in claim 4, wherein the at least one handling detection electrode and/or the at least one additional detection electrode of the capacitive proximity sensor comprises a conductive coating, such as a metallization.

6. The sniffer probe as claimed in claim 5, wherein the handle comprises two half-shells, the conductive coating being deposited on an internal surface of the half-shells.

7. A leak detector for checking the leak-tightness of an object to be tested by means of a tracer gas, the leak detector comprising:
    the sniffer probe as claimed in claim 1,
    a base unit comprising a pumping device, a gas detector fluidly connected to the pumping device and the processing unit, and
    a flexible pipe fluidly connecting the pumping device of the base unit to the sniffer probe.

8. The leak detector as claimed in claim 7, further comprising an isolation valve arranged between the pumping device and the sniffer probe, the processing unit being configured to control an opening of the isolation valve when the handling detection signal associated with the at least one handling detection electrode is greater than or equal to a threshold and to control a closing of the isolation valve when the handling detection signal is less than the threshold.

9. A leak detection method using the sniffer probe as claimed claim 1, wherein:
    the suction into the sniffer end piece is controlled when the handling detection signal associated with the at least one handling detection electrode is greater than or equal to a threshold, and
    stopping of the suction into the sniffer end piece is controlled when the handling detection signal is less than the threshold.

10. The leak detection method as claimed claim 9, wherein:
    the suction into the sniffer end piece is controlled when a first handling detection signal associated with a first handling detection electrode and a second handling detection signal associated with a second handling detection electrode are simultaneously greater than or equal to the threshold, and
    the stopping of the suction into the sniffer end piece is controlled when the first and/or the second handling detection signal is less than the threshold.

11. The leak detection method as claimed in claim 9, wherein a speed of rotation of a rough-vacuum pump of the pumping device is reduced when the stopping of the suction into the sniffer end piece is controlled.

12. A leak detection method using a sniffer probe for a leak detector for checking the leak-tightness of an object to be tested by means of a tracer gas, wherein:
the sniffer probe includes:
a sniffer end piece configured to be connected to a pumping device of the leak detector;
a handle bearing the sniffer end piece; and
a capacitive proximity sensor comprising at least one handling detection electrode arranged in a grip portion of the handle, the capacitive proximity sensor being configured to send a handling detection signal associated with the at least one handling detection electrode to a processing unit of the leak detector in order to control suction into the sniffer end piece as a function of the handling detection signal,
the suction into the sniffer end piece is controlled when the handling detection signal associated with the at least one handling detection electrode is greater than or equal to a threshold,
stopping of the suction into the sniffer end piece is controlled when the handling detection signal is less than the threshold,
the suction into the sniffer end piece is controlled when a first handling detection signal associated with a first handling detection electrode and a second handling detection signal associated with a second handling detection electrode are simultaneously greater than or equal to the threshold, and
the stopping of the suction into the sniffer end piece is controlled when the first and/or the second handling detection signal is less than the threshold.

13. A leak detector for checking the leak-tightness of an object to be tested by means of a tracer gas, comprising:
a processing unit; and
a sniffer probe including:
a sniffer end piece configured to be connected to a pumping device of the leak detector,
a handle bearing the sniffer end piece, and
a capacitive proximity sensor comprising at least one handling detection electrode arranged in a grip portion of the handle, the capacitive proximity sensor being configured to send a handling detection signal associated with the at least one handling detection electrode to the processing unit in order to control suction into the sniffer end piece as a function of the handling detection signal,
wherein the processing unit is configured to:
control the suction into the sniffer end piece when the handling detection signal associated with the at least one handling detection electrode is greater than or equal to a threshold,
control stopping of the suction into the sniffer end piece when the handling detection signal is less than the threshold,
control the suction into the sniffer end piece when a first handling detection signal associated with a first handling detection electrode and a second handling detection signal associated with a second handling detection electrode are simultaneously greater than or equal to the threshold, and
control the stopping of the suction into the sniffer end piece when the first and/or the second handling detection signal is less than the threshold.

* * * * *